United States Patent [19]

Johnson et al.

[11] Patent Number: 5,960,036
[45] Date of Patent: Sep. 28, 1999

[54] APPARATUS AND METHOD FOR AUTO-CONFIGURING A COMMUNICATION SYSTEM

[75] Inventors: Terence L. Johnson; Peter R. Molnar; Jeffrey P. Gleason; Howard E. Levin, all of Austin, Tex.

[73] Assignee: Motorola, Inc., Schaumburg, Ill.

[21] Appl. No.: 08/741,635

[22] Filed: Nov. 4, 1996

[51] Int. Cl.⁶ .................................. H04L 1/38; H04L 5/16
[52] U.S. Cl. ........................ 375/219; 375/222; 375/377; 379/93.29; 455/4.2; 370/278
[58] Field of Search .................................. 375/219, 222, 375/377; 379/93.26, 93.28, 93.08, 93.06; 455/73, 4.2; 370/276, 277, 278, 279, 280, 281, 282

[56] References Cited

U.S. PATENT DOCUMENTS

| | | | |
|---|---|---|---|
| 4,438,511 | 3/1984 | Baran | 370/94 |
| 4,679,227 | 7/1987 | Hughes-Hartogs | 379/98 |
| 4,731,816 | 3/1988 | Hughes-Hartogs | 379/98 |
| 4,890,316 | 12/1989 | Walsh et al. | 379/98 |
| 4,980,897 | 12/1990 | Decker et al. | 375/38 |
| 5,408,260 | 4/1995 | Arnon | 348/6 |
| 5,579,305 | 11/1996 | Norrell et al. | 370/32.1 |
| 5,619,553 | 4/1997 | Young et al. | 379/61 |
| 5,668,802 | 9/1997 | Chalmers et al. | 370/276 |
| 5,673,290 | 9/1997 | Cioffi | 375/260 |
| 5,719,856 | 2/1998 | May | 370/282 |
| 5,737,337 | 4/1998 | Voith et al. | 371/2.2 |
| 5,742,527 | 4/1998 | Rybicki et al. | 364/705.05 |
| 5,757,803 | 5/1998 | Russell et al. | 370/494 |
| 5,790,550 | 8/1998 | Peeters et al. | 370/480 |

OTHER PUBLICATIONS

Alliance for Telecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and pp. 2–171.

*Primary Examiner*—Chi H. Pham
*Assistant Examiner*—Bryan Webster
*Attorney, Agent, or Firm*—J. Gustav Larson; Paul J. Polansky

[57] ABSTRACT

A communications system 10 having an Asymmetric Digital Subscriber Line (ADSL) transceiver (24) is provided which may be configured either as a central office or a remote terminal in a system. The transceiver (24) operates in a listen/report idle state to report line activity to a host processor (22) prior to being configured as a central office or remote terminal. The host processor configures the transceiver (24) as a central office, remote terminal, or as otherwise specified based on the line activity.

26 Claims, 4 Drawing Sheets

APPARATUS AND METHOD FOR AUTO-CONFIGURING A COMMUNICATION SYSTEM

CROSS REFERENCE TO RELATED, COPENDING APPLICATIONS

This application is related to commonly assigned copending patent application having attorney docket number SC90255A, entitled "Single-Chip Software Configurable Transceiver For Asymmetric Communication System"

FIELD OF THE INVENTION

This invention relates generally to a communication system, and more specifically, to a transceiver for an asymmetric communication system.

BACKGROUND OF THE INVENTION

In order to make high data rate interactive services such as video conferencing available to more residential and small business customers, high-speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted-pair media, are not designed to support the data rates, or bandwidth, required for interactive services. Asymmetric Digital Subscriber Lines (ADSL) technology has been developed to increase the effective bandwidth of existing twisted-pair connections, allowing interactive services to be provided without requiring the installation of new fiber optic cable.

Discrete Multi-Tone (DMT) is a multi-carrier technique that divides the available bandwidth of twisted-pair connections into many subchannels, or bins. The DMT technique has been implemented in ADSL standard T1.413 for use in ADSL systems. In ADSL, DMT is used to generate 250 separate 4.3125 kHz subchannels from 26 kHz to 1.1 MHz for downstream transmission to the end user, and 26 subchannels from 26 kHz to 138 kHz for upstream transmission by the end user.

The rate at which data is to be transmitted is a function of whether or not a device is implemented as an ADSL central office terminal (ATU-C) or an ADSL remote terminal (ATU-R). According to the ADSL standard T1.413, a device used in an ADSL communications system is designated as either an ATU-C or an ATU-R before digital communications are initiated. Therefore, to be used in the ADSL communications system, the device requires system software and hardware which is dedicated to the device being used as either an ATU-C or an ATU-R, but not both. Until configured as an ATU-C or ATU-R, the passing of specific information such as configuration information is not possible. Such dedicated systems decrease the flexibility of the communication system.

DETAILED DESCRIPTION OF THE INVENTION

Figure 1:
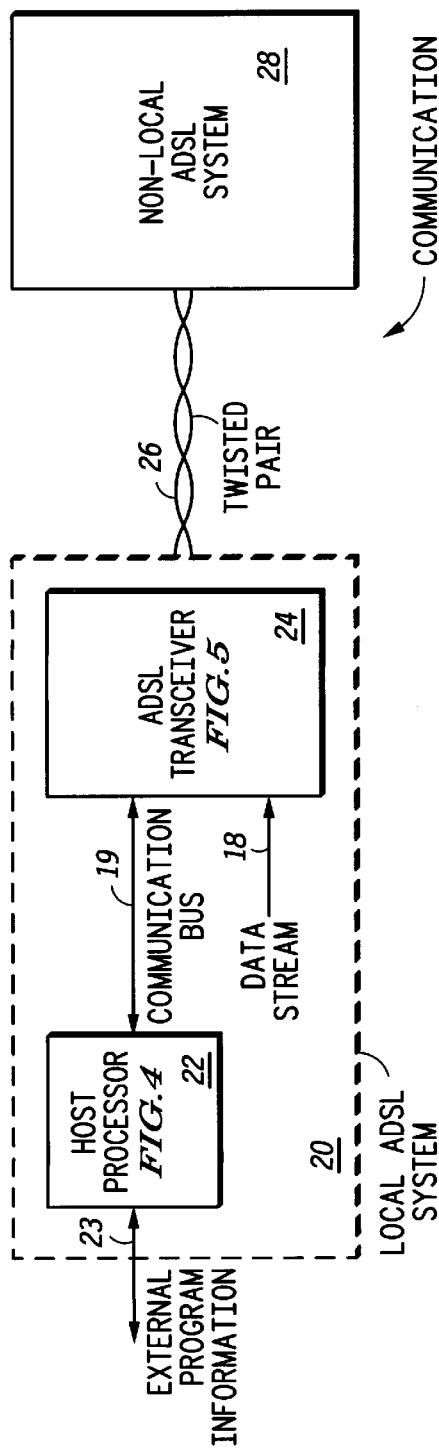
FIG. 1 illustrates, in block diagram form, a communication system in accordance with a first embodiment of the present invention.

Generally, the present invention provides a single chip transceiver solution which may be configured either as a central office or a remote terminal in an Asymmetric Digital Subscriber Line (ADSL) system. Furthermore, the transceiver implemented in the present invention may be configured by software to communicate at different data rates depending on external control information which may be provided in the form of a specific tone transmitted by another data processor or by a host processor that is directly connected to the ADSL transceiver. Additionally, it should be noted that the ADSL transceiver itself may provide control information which allows it to configure itself in an appropriate manner, without the need for an external host processor.

As background, it should be noted that there are two categories of transceivers which comply with ADSL standards defined in the standard T1.413 published by the American National Standards Institute, Inc. (ANSI). In the first category of transceivers, defined by this standard, an ATU-R (ADSL transceiver unit, remote terminal) is a remote unit which is described as a customer's end of the data link and which transmits data at a lower rate. A second category of transceiver defined by the ADSL standard is the ATU-C (ADSL transceiver unit, central office end) which is described as a service provider's end of the data link and which transmits data at a higher rate.

The present invention includes a single chip which may be configured prior to being dedicated as an ATU-C or an ATU-R by a local host processor or control circuitry. This configuration could specify the transceiver to be an ATU-C or ATU-R. As previously mentioned, the present invention may also include circuitry which will allow it to configure itself without the need for a local host processor. Software, as well as circuitry, may also be used by the single chip implementation of the present invention to allow for self configuration.

The ADSL standard T1.413 specifies separate initialization states that configure the transceiver of the present invention as either an ATU-C or an ATU-R. Because the present invention provides the transceiver, which may operate in either configuration, an additional initialization or auto-configuration state has been added in the present invention. Therefore, instead of having a predetermined configuration upon power-up as is implemented in prior art solutions, the present invention enters a generic idle state that allows reception of configuration information from an opposite, or non-local, end of a data link as well as from a local host processor.

When the single-chip transceiver of the present invention is in the generic idle state, the transceiver is in a "listening and reporting" mode. When in this mode, the transceiver monitors a data link and reports any activity which indicates whether or not the transceiver should be configured as either an ATU-C or an ATU-R. The monitored activity may, among other activities, be manifested by the receipt of varying signal levels at various frequencies and transmission of data in a specified protocol. For example, the activity detected by the transceiver provides necessary information to discriminate between a non-local ATU-C and a non-local ATU-R attempting to initiate an activation of the ADSL transceiver and configure the transceiver appropriately. With the auto-configuration capability of the present invention, a high speed communication transmission direction of the ADSL transceiver may be chosen depending on required services. In the following discussion, the connectivity and operation of several embodiments of an ADSL transceiver which implement the present invention will be provided in greater detail.

CONNECTIVITY OF THE INVENTION

In the following description of the connectivity of the present invention, the term "bus" will be used to relate to the plurality of signals or conductors which may be used to transfer one or more various types of information such as data, addresses, control, or status. The terms "assert" and "negate" will be used when referring to the rendering of a signal, status bit, or similar apparatus into its logically true or logically false state, respectively. If the logically true state is a logic level 1, the logically false state will be a logic level 0. If the logically true state is a logic level 0, the logically false state would be a logic level 1.

FIG. 1 illustrates in block diagram form, a communication system 10. Communication system 10 includes a local ADSL system 20 and a non-local ADSL system 28. Local ADSL system 20 is coupled to non-local ADSL system 28 by a twisted pair 26. Local ADSL system 20 includes a host processor 22 and an ADSL transceiver 24. An external program information bus 23 is bidirectionally coupled to host processor 22. A data stream bus 18 is provided to ADSL transceiver 24. Host processor 22 is coupled to ADSL transceiver 24 by a communication bus 19.

Figure 2:
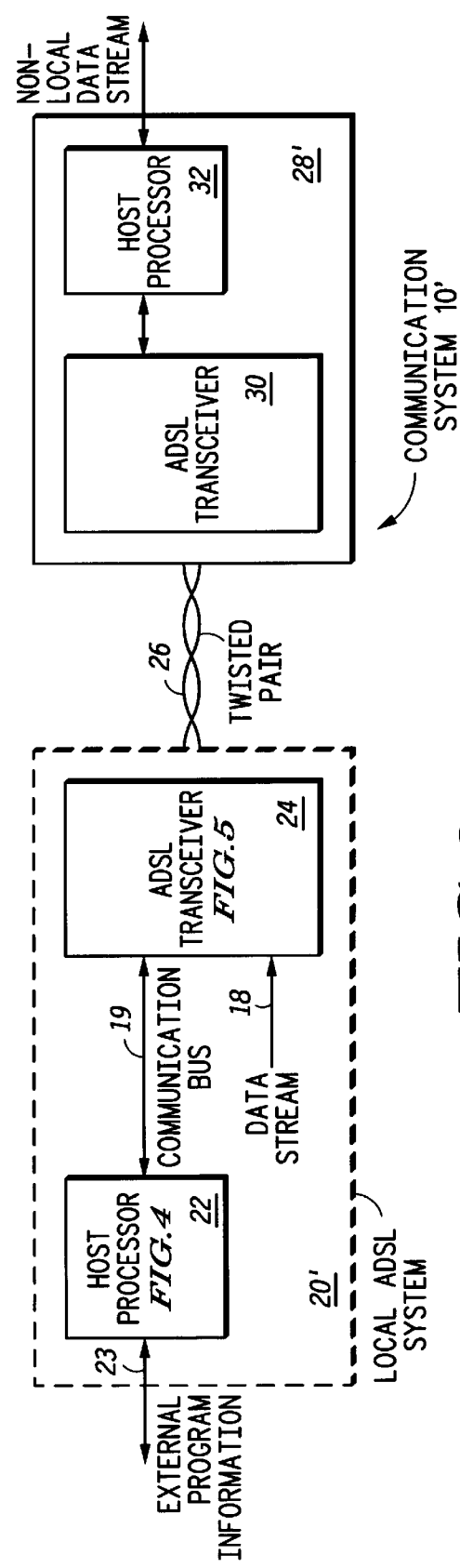
FIG. 2 illustrates, in block diagram form, a communication system in accordance with a second embodiment of the present invention.

FIG. 2 illustrates, in block diagram form, a communication system 10'. Communication system 10' includes a local ADSL system 20' and a non-local ADSL system 28'. Local ADSL system 20' is coupled to non-local ADSL system 28' by twisted pair 26. Local ADSL system 20 includes host processor 22 and ADSL transceiver 24. External program information bus 23 is coupled to host processor 22. Data stream bus 18 is coupled to ADSL transceiver 24. Host processor 22 is coupled to ADSL transceiver 24 via communication bus 19. Non-local ADSL system 28' includes an ADSL transceiver 30 and a host processor 32. ADSL transceiver 30 is coupled to host processor 32. Host processor 32 bidirectionally communicates a non-local data stream.

Figure 3:
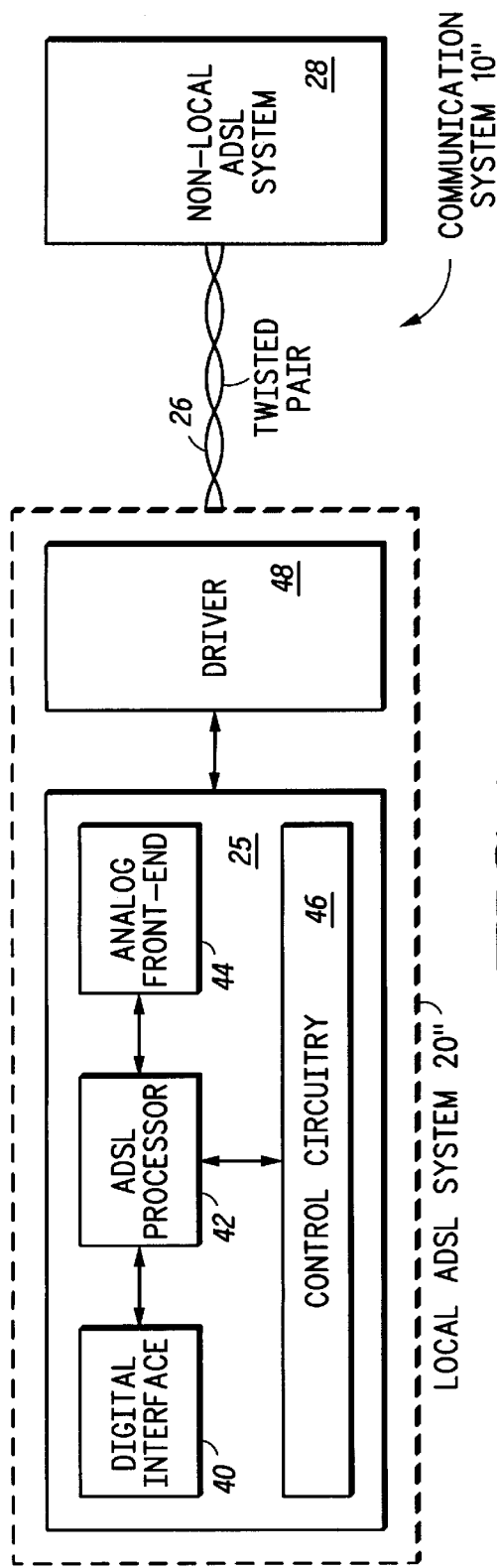
FIG. 3 illustrates, in block diagram form, a communication system in accordance with a third embodiment of the present invention.

FIG. 3 illustrates, in block diagram form, 1". Communication system 10" includes a local ADSL system 2" and a non-local ADSL system 28. Local ADSL system 2" is coupled to non-local ADSL system 28 via a twisted pair 26. Local ADSL system 2" includes a transceiver 25 and a driver 48. Transceiver 25 is bidirectionally coupled to driver 48. Transceiver 25 includes a digital interface 40, an ADSL processor 42, an analog front-end 44, and a control circuit 46. Digital interface 40 is bidirectionally coupled to ADSL processor 42. ADSL processor 42 is bidirectionally coupled to both analog front-end 44 and control circuitry 46.

Figure 4:
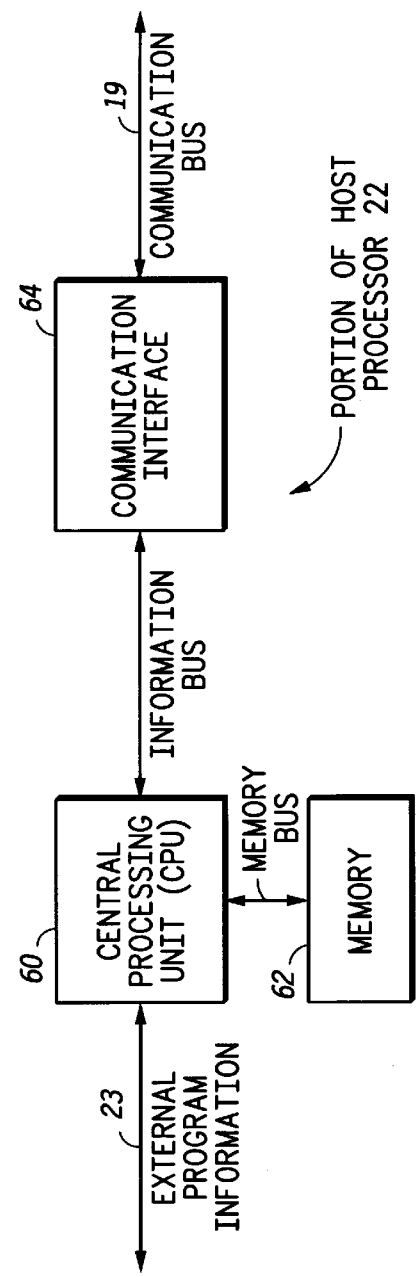
FIG. 4 illustrates, in block diagram form, a portion of a host processor in accordance with the communication system of the present invention.

FIG. 4 illustrates, in block diagram form, a portion of host processor 22 of FIG. 1 of the present invention. The portion of host processor 22 includes a central processing unit (CPU) 60, a memory 62, and a communication interface 64. External program information bus 23 is bidirectionally coupled to CPU 60. CPU 60 is bidirectionally coupled to memory 62 via a memory bus. CPU 60 is bidirectionally coupled to communication interface 64 via an information bus. Communication interface 64 is bidirectionally coupled to communication bus 19.

Figure 5:
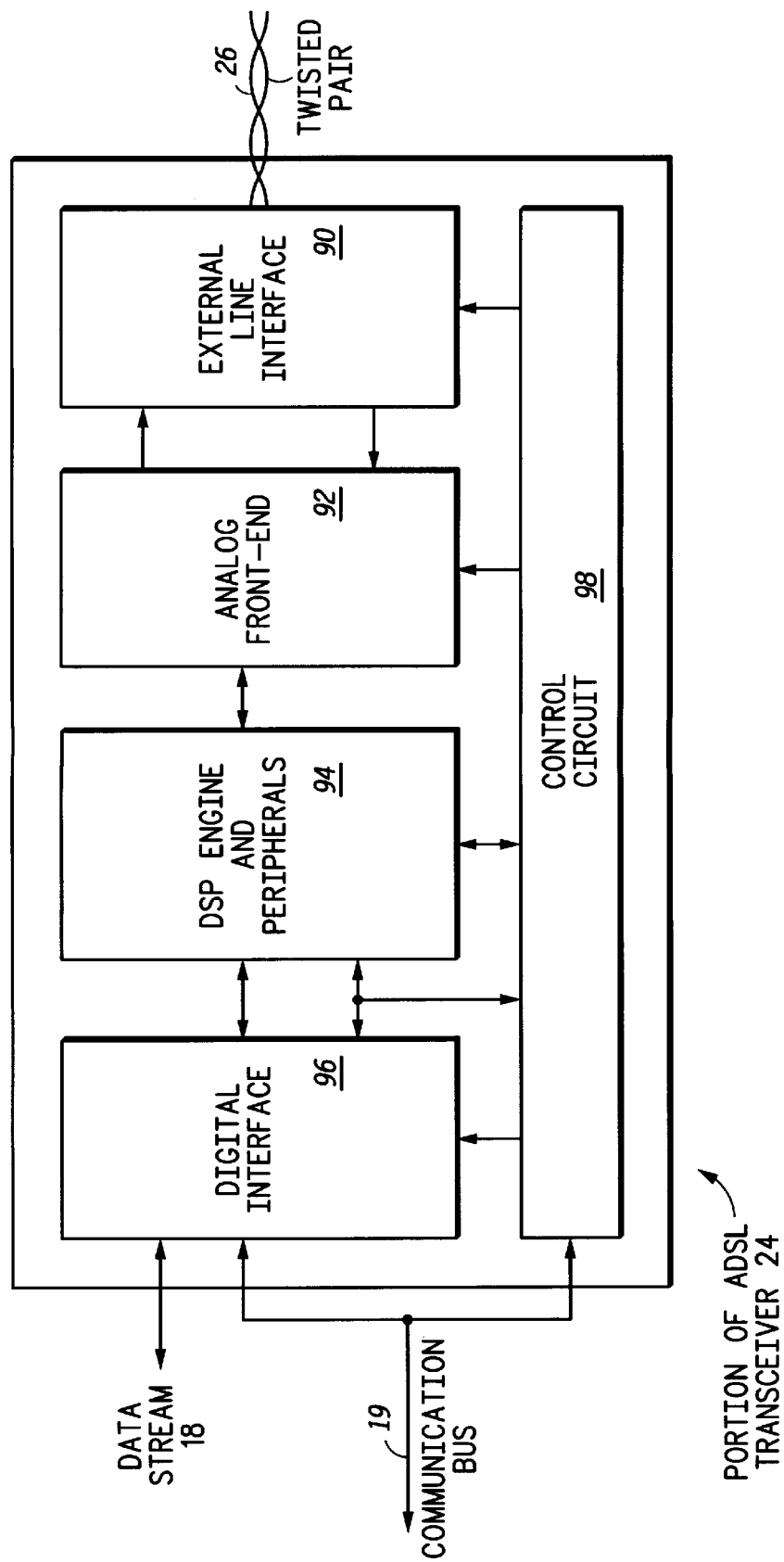
FIG. 5 illustrates, in block diagram form, a portion of an ADSL processor in accordance with the communication system of the present invention.

FIG. 5 illustrates a portion of ADSL transceiver 24 in greater detail. The portion of ADSL transceiver 24 includes a digital interface 96, a DSP engine and peripherals 94, an analog front-end 92, an external line interface 90, and a control circuit 98. Communication bus 19 is bidirectionally coupled to digital interface 96 and control circuit 98. Digital interface 96 is bidirectionally coupled to DSP engine and peripherals 94. Digital interface 96 and DSP engine and peripherals 94 provide a portion of communication bus 19. Digital interface 96 is coupled to control circuit 98 to receive control information. DSP engine and peripherals 94 is bidirectionally coupled to control circuit 98. Analog front-end 92 is coupled to control circuit 98 to receive control information therefrom. Analog front-end 92 is coupled to external line interface 90 to provide information thereto and to receive information therefrom. External line interface 90 is coupled to twisted pair 26.

DESCRIPTION OF OPERATION

FIG. 1 illustrates, in block diagram form, a communication system 10. In communication system 10, local ADSL system 20 communicates with nonlocal ADSL system 28 over twisted pair 26. Twisted pair 26 is typically implemented as two copper wires. However, it should be noted that in the present invention, twisted pair 26 may be replaced with other communication media including fiber optic transmission lines, coaxial cable, and wireless media, etc. The data communicated between local ADSL system 20 and non-local ADSL system 28 includes the transfer of data for many applications including telecommunications, video, audio, and internet information.

As previously mentioned, a standard for communicating this information between this local and non-local ADSL systems is disclosed in the ADSL standard T1.413. As part of the standard, a speed with which data is transferred from local ADSL 20 to non-local ADSL system 28 is dependent on a designation of each as either an ATU-R or an ATU-C. For example, when local ADSL system 20 is an ATU-R and non-local ADSL system 28 is an ATUC, local ADSL system 20 will transmit data at a minimum rate and receive data at a higher data rate. It should also be noted that local ADSL system 20 may be configured to transmit and receive data at the same data rate in certain applications.

As illustrated in FIG. 1, local ADSL system 20 includes host processor 22 and ADSL transceiver 24. Data, provided via data stream 18, is communicated with host processor 22 and ADSL transceiver 24. Data stream 18 may be provided by a multitude of sources (not illustrated herein). Such sources may include an internet provider, a video on demand supplier, or any source of modem data. Data stream 18 is provided directly to ADSL transceiver 24. Subsequently, ADSL transceiver 24 encodes the information transferred via data stream 18, modulates the encoded data, and converts it to an analog signal. The analog signal is subsequently transferred to non-local ADSL system 28 via twisted pair 26. ADSL transceiver 24 will subsequently be discussed in greater detail.

An external user may program host processor 22 to control ADSL transceiver 24. It should be noted, that with respect to FIG. 1 that an external user at non-local ADSL system 28 may or may not be able to modify or control non-local ADSL system 28 based on the overal system configuration.

FIG. 2 illustrates an alternate embodiment of communication system 10 which is labeled 10'. In communication system 10', non-local ADSL system 28' is implemented as an ADSL transceiver 30 and a host processor 32. It should be noted that ADSL transceiver 30 and host processor 32 are the same as and function in a similar manner to host processor 22 and ADSL transceiver 24 of local ADSL system 20. By adding host processor 32 to non-local ADSL system 28' of communication system 10', an external user may be able to configure both the local ADSL system 20 and non-local ADSL system 28'.

Communication system 10' of FIG. 2 illustrates a system which provides greater flexibility because a user of either local ADSL system 20 or non-local ADSL system 28' may control a corresponding ADSL system through software programming.

FIG. 3 illustrates in block diagram form, a third embodiment of the present invention. FIG. 3 illustrates communication system 10" which implements local ADSL system 21 and non-local ADSL system 28. As previously discussed with respect to FIGS. 1 and 2, local ADSL system 21 communicates with non-local ADSL system 28 via twisted pair 26. However, in the implementation illustrated in FIG. 3, local ADSL system 21 does not include a host processor and all configuration decisions are performed internally within an ADSL transceiver 25. ADSL transceiver 25 is coupled to driver 48. It should be noted that driver 48 may be implemented either externally to transceiver 25 or integrated on a single chip together with the components of transceiver 25. In transceiver 25 of FIG. 3, ADSL processor 42 may receive data communication via twisted pair 26 and process that information to determine whether or not local ADSL system 21 should be configured as an ATU-R, an ATU-C or performs other configuration operations. Thus, in the embodiment of the invention illustrated herein, ADSL processor 42 serves a similar function as host processor 22 illustrated in FIGs.1 and 2.

Each of FIGS. 1–3 illustrates a system in which the present invention may be implemented. For the following discussion of the specific operation of the present invention, FIG. 1 will be referred to in greater detail. However, it should be noted that the subject matter and methodology disclosed in the following description of operation may also be used with respect to the systems disclosed in FIG. 2 and FIG. 3. As has been previously mentioned, to provide greater flexibility and control of local ADSL system 20, control of the configuration of ADSL transceiver 24 is implemented in host processor 22. Host processor 22 may be accessed by an external user and programmed to perform application specific configuration of ADSL transceiver 24.

FIG. 4 illustrates a portion of host processor 22 in greater detail. It should be noted the portion of host processor 22 illustrated in FIG. 4 includes CPU 60 and memory 62, operation of which is well known in the data processing art and will not be described in greater detail herein. Similarly, in the present embodiment of the invention described in FIG. 1, communication interface 64 is also implemented in a manner which is well known to those skilled in the art and will not be described in greater detail herein.

In the portion of host processor 22, an external user provides external program information to central processing unit (CPU) 60 to program host processor 22 to selectively configure ADSL transceiver 24. In addition to receiving program information externally via external program information bus 23, CPU 60 may access such program information from memory 62 via the memory bus. When host processor 22 is programmed, host processor 22 may provide control information to ADSL transceiver 24 which enables ADSL 24 to either enter a "listen and report" state, be configured as an ATU-C, as an ATU-R, or other configuration operation. The other configuration operation, for example, may provide control information to ADSL 24 which enables ADSL transceiver 24 to function in another manner which is not currently specified in ADSL standard T1.413. For example, ADSL transceiver 24 may be configured by host processor 22 to establish general configuration parameters of operation.

Even if host processor 22 does not program ADSL transceiver 24 to function as an ATU-C or an ATU-R, host processor 22 communicates with ADSL transceiver 24 via communication bus 19 to receive information from ADSL transceiver 24, process that information to determine whether or not ADSL transceiver 24 is an ATU-C or an ATU-R, and configure ADSL transceiver 24 accordingly. If host processor 22 has been programmed, host processor 22 may selectively configure ADSL transceiver 24 to function as an ATU-C or an ATU-R immediately upon start-up and without considering any external data. On the other hand, host processor 22 may receive information from ADSL transceiver 24 and use that information to determine a configuration of ADSL transceiver 24. The determination of that configuration will subsequently be described in greater detail.

Figure 6:
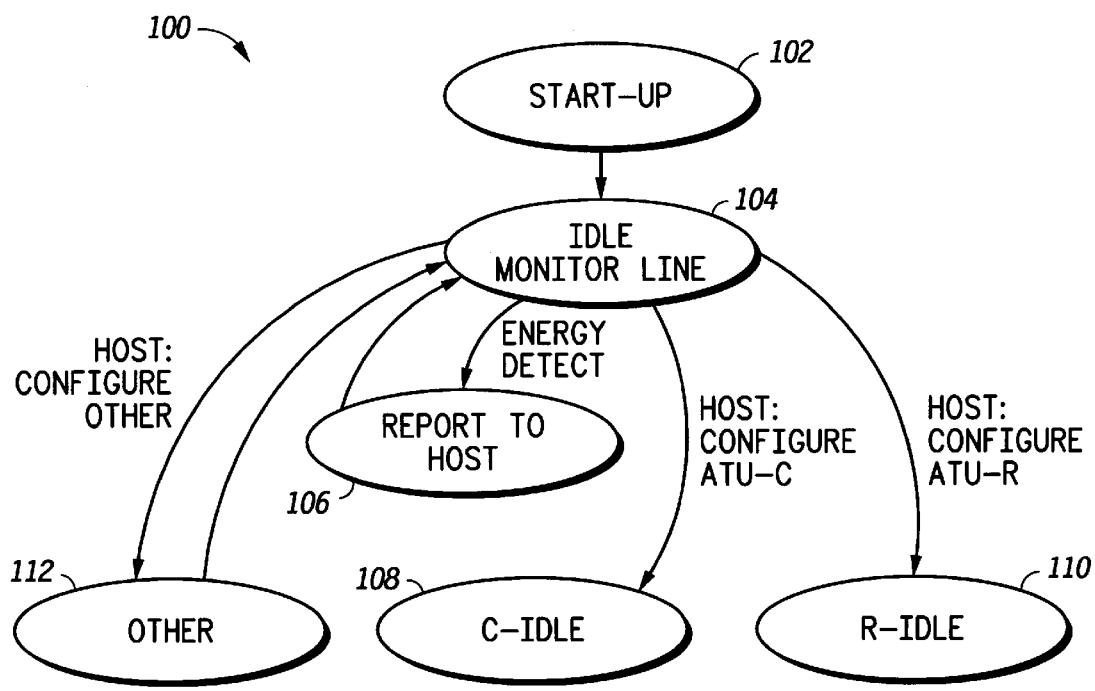
FIG. 6 illustrates, in state diagram form, a state operation executed by the ADSL processor in accordance with the communication system of the present invention.

FIG. 6 illustrates a state diagram describing a methodology for configuring ADSL transceiver 24. In the state diagram, in a state 102, ADSL transceiver 24 is powered up. In the embodiment of the invention illustrated in FIG. 1, host processor 22 provides all of the control information necessary to power up ADSL transceiver 24. After state 102 is completed, ADSL transceiver 24 enters a state 104. State 104 is a generic idle state in which ADSL transceiver 24 monitors communications provided by non-local ADSL system 28. This is also known as a listen/report mode of operation. It should also be noted that ADSL transceiver 24 monitors communications provided by host processor 22 via communication bus 19 to determine whether or not host processor 22 has provided configuration or control data to ADSL transceiver 24. ADSL transceiver 24 monitors communications provided by the host processor 22 at any state of the state diagram illustrated in FIG. 6.

In a state 106, of FIG. 6, ADSL transceiver 24 receives information from a non-local ADSL system 28 via twisted pair 26. In one embodiment of the present invention, ADSL transceiver 24 monitors this communication to determine whether or not energy is being provided at specific frequencies. If a specific pre-determined energy/frequency level is detected, ADSL transceiver 24 reports the detection of this energy to host processor 22 via communication bus 19 in step 106. In another embodiment of the present invention, the ADSL transceiver would pass all energy/frequency to the Host processor 22. In either embodiment, host processor 22 subsequently analyzes the energy/frequency information provided by the transceiver to determine if configuration of ADSL transceiver 24 is warranted based upon the information.

The energy detected by ADSL transceiver 24 and provided to host processor 22 will determine the function, if any, to be performed upon the ADSL transceiver (24). The ADSL standard T1.413 sets forth various protocols which must be complied with for devices functioning as an ATU-R and devices functioning as an ATU-C. For example, if non-local ADSL system 28 transmits a C-Tone signal on a carrier 72 as specified in the ADSL standard T1.413, ADSL transceiver 24 will detect that signal and provide it to host processor 22. Host processor 22 will then evaluate that information to determine whether or not ADSL transceiver should be configured as an ATU-R. Similarly, if non-local ADSL system 28 transmits a C-Act signal to ADSL transceiver 24 via twisted pair 26, ADSL transceiver 24 will then transmit said information to host processor 22 for evaluation as these signals indicate that non-local ADSL system 28 is functioning as an ATU-C and is initiating a communication link to an ATU-R, host processor 22 will probably configure ADSL transceiver 24 as an ATU-R. As with the C-Tone signal, the C-Activate signal is specified in greater detail in the ADSL standard T1.413.

Similarly, non-local ADSL system 24 may provide signals which indicate that it is operating as an ATU-R. For example, when non-local ADSL system 28 provides an R-Act-Req, non-local ADSL system 28 is indicating that it is initiating a communication link to an ATU-C. Again, as previously described, ADSL transceiver 24 will provide that information to host processor 22 which will evaluate whether or not to configure ADSL transceiver 24 as an ATU-C. Furthermore, it should be noted that non-local ADSL system 28 may provide signals which when received by host processor 22 through ADSL transceiver 24 enable host processor 22 to configure ADSL transceiver 24.

After ADSL transceiver 24 detects energy and reports that information to host processor 22, host processor 22 will provide control information via communication bus 19 to configure ADSL transceiver 24 as either an ATU-C, an ATU-R or perform an other configuration. Depending on a value of the energy detected, host processor 22 provides a Configure ATU-C signal to configure ADSL transceiver 24 as an ATU-C or a Configure ATU-R signal to configure ADSL transceiver 24 as an ATU-R. When ADSL transceiver 24 receives the Configure ATU-C signal, ADSL transceiver 24 enters into a C -Idle state as represented by step 108. The C-Idle state is defined in greater detail in the ADSL standard T1.413. Similarly, when ADSL transceiver 24 receives a Configure ATU-R signal, ADSL transceiver 24 enters into an R-Idle state represented at step 110. During the R-Idle state, ADSL transceiver 24 monitors twisted pair 26 for signals provided by non-local ADSL system 28 to detect only those tones or signals that originate from an ATU-C. Upon detection of such signals, ADSL transceiver 24 reports each to host processor 22 and waits for control information therefrom. State 112 is entered when information requiring an other configuration to occur is received. Generally, once the other configuration is complete, the state will transition back to the Idle Monitor Line 104. It is understood that for certain implementations of other that it may remain in the other state. It is further understood that the other state 112 represents any number of other state functions. An example of a use of the Other state 112 would be to specify transceiver register (not shown) information.

ADSL transceiver 24 implements each of the states previously described using an apparatus illustrated in greater detail in FIG. 5. In FIG. 5, the information provided by non-local ADSL system 28 is provided via twisted pair 26 to an external line interface 90. External line interface 90 receives a signal provided by non-local ADSL system 28 and provides it to analog front-end 92. Analog front-end 92 converts the signal from analog to digital and provides it to DSP engine and peripherals 94. DSP engine and peripherals 94 analyze the signal to detect whether or not a specific frequency and energy level of the provided signal. If the receive signal meets a specified signal parameter, DSP engine and peripherals 94 provides a messaging signal to control circuit 98 which includes a host microprocessor interface and an initialization control circuit (not illustrated in detail herein). Control circuit 98 subsequently provides the messaging signal to host processor 22 via communications bus 19. Upon receipt and evaluation of the messaging signal, host processor 22 selectively provides a configuration signal to ADSL transceiver 24 via communications bus 19. The configuration signal is provided to both digital interface 96 and DSP engine and peripherals 94. Both digital interface 96 and DSP engine peripherals 94 are configured to operate as either an ATU-R or and ATU-C in response to the configuration signal. Configuration includes setting of all necessary parameters and selection of operational modes effecting system hardware and software.

The implementation of the invention described herein is provided by way of example only, and other implementations may exist for executing the function described herein. For example, dedicated hardware could replace the DSP and peripherals 94 of FIG. 5 to detect line activity, and subsequently provide the activity to the host processor.

While the present invention has been illustrated and described with reference to specific embodiments, further modifications and improvements will occur to those skilled in the art. It is to be understood, therefore, that this invention is not limited to the particular forms illustrated herein and that the appended claims cover all modifications that do not depart from the scope and spirit of this invention.

We claim:

1. A method for configuring a first transceiver for asymmetric communication over a transmission media, the method comprising the steps of;
    entering an idle state after startup;
    receiving a configuration signal while in the idle state, wherein the configuration signal specifies one of a plurality of asymmetric configuration states; and
    configuring the first transceiver to operate in the one of a plurality of asymmetric configuration states based on the configuration signal.

2. The method of claim 1 wherein:
    the step of receiving comprises receiving a configuration signal, wherein the configuration signal specifies one of the plurality of asymmetric configuration states or a general configuration data; and
    the step of configuring comprises configuring the first transceiver to operate in the asymmetric configuration state where the configuration signal specifies one of the plurality of asymmetric state, or configuring the transceiver based on the general configuration data.

3. The method of claim 1 wherein the asymmetric configuration state specifies either a first state or a second state.

4. The method of claim 3 wherein the first state transmits data at a first transmit rate and the second state transmits data at a second transmit rate.

5. The method of claim 4 wherein the first transmit rate and the second transmit rate are substantially the same.

6. The method of claim 4 wherein the first transmit rate and the second transmit rate are substantially different.

7. The method of claim 1, wherein the first transceiver implements a Discrete Multi-Tone technique.

8. The method of claim 7, wherein the first transceiver implements an Asymmetric Digital Subscriber Line (ADSL) standard.

9. The method of claim 8 wherein the asymmetric configuration state specifies one of a first state and a second state.

10. The method of claim 9 wherein the first state is a remote terminal state and the second state is central office state.

11. The method of claim 1 future comprising the step of:
receiving a transmission media activity; and
reporting the transmission media activity to a data processor, wherein the data processor provides the configuration signal.

12. The method of claim 11 wherein the data processor is an integrated portion of the first transceiver.

13. The method of claim 11 wherein the data processor is a portion separate from the first transceiver.

14. The method of claim 12 further comprising the following steps:
providing the transmission media activity from a second transceiver, wherein the transmission media activity indicates that the second transceiver is operating in a first state; and
wherein, based on the transmission media activity, the data processor specifies the asymmetric configuration state substantially equal to a second state.

15. The method of claim 14 wherein the first state is different than the second state.

16. The method of claim 14 wherein the first state is substantially the same as the second state.

17. The method of claim 11 wherein the transmission media activity includes an energy component.

18. The method of claim 11 wherein the transmission media activity includes a frequency component.

19. A method for configuring a communication system having a first transceiver and a second transceiver coupled by a transmission media, the method comprising the steps of:
initializing the first transceiver to an idle state, wherein during the idle state the first transceiver monitors an activity on the transmission media;
receiving the activity; and
initializing the first transceiver to a first state, when the activity indicates the second transceiver is in a second state;
transferring data between the first transceiver and the second transceiver following the step of initializing the first transceiver ot a first state.

20. A transceiver system for asymmetric communications, the transceiver comprising:

a data processor;
a listen/report circuitry coupled to the data processor for receiving an activity on the transmission media, and for providing a representation of the activity to the data processor;
a first receive state circuitry for receiving data at a first receive rate;
a second receive state circuitry for receiving data at a second receive rate; and
a configuration means coupled to the data processor for specifying whether the first transceiver is in a listen/report state in a first receive state, or in a second receive state, wherein during the listen/report state the listen/report circuitry is used, during the first receive state the first receive state circuitry is used, and during the second receive state the second receive state circuitry is used.

21. The transceiver system of claim 20, wherein the transceiver system is a single-chip integrated circuit.

22. The transceiver system of claim 20, wherein the data processor is separate from the single-chip integrated circuit.

23. The transceiver system of claim 20, wherein the first receive state circuitry receives data at a first rate, and the second receive state circuitry transmits data at a second rate, and the transceiver system further comprises:
a first transmit state circuitry for transmission of data at the second rate;
a second transmit state circuitry for transmission of data at the first rate; and
wherein the first receive state includes the first transmit state additionally uses the first transmit circuitry, and the second transmit state additionally uses the second transmit circuitry.

24. The transceiver system of claim 20, wherein the configuration means comprises a register.

25. The transceiver system of claim 20, wherein the configuration means comprises software.

26. The method of claim 1, wherein the idle state is a different state than the any of the plurality of asymmetric configuration states.

* * * * *